(12) United States Patent
Lee et al.

(10) Patent No.: US 7,026,902 B2
(45) Date of Patent: Apr. 11, 2006

(54) MAGNET USED WITH AN OPTICAL PICKUP ACTUATOR

(75) Inventors: Jin-won Lee, Gyeonggi-do (KR); Dae-hwan Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/100,226

(22) Filed: Mar. 19, 2002

(65) Prior Publication Data

US 2003/0058073 A1    Mar. 27, 2003

(30) Foreign Application Priority Data

Sep. 27, 2001   (KR) .............................. 2001-60135

(51) Int. Cl.
*H01F 7/02*   (2006.01)

(52) U.S. Cl. .................................... 335/302; 369/44.15

(58) Field of Classification Search ........ 335/220–234, 335/302–306; 369/44.14–44.15, 244–246; 310/154.33–154.38
See application file for complete search history.

(56) References Cited

U.S. PATENT DOCUMENTS

| | | | | |
|---|---|---|---|---|
| 5,844,881 A | * | 12/1998 | Kasuga et al. | ............... 369/244 |
| 5,881,033 A | * | 3/1999 | Murakami et al. | ........ 369/44.14 |
| 6,031,812 A | * | 2/2000 | Liou | ........................... 369/244 |
| 6,476,701 B1 | * | 11/2002 | Muraji | ........................ 335/220 |
| 6,507,554 B1 | * | 1/2003 | Son et al. | .................... 369/244 |
| 6,594,099 B1 | * | 7/2003 | Serizawa | ..................... 360/66 |

FOREIGN PATENT DOCUMENTS

| | | | |
|---|---|---|---|
| JP | 6126976 | * | 2/1986 |
| JP | 61-208815 | | 9/1986 |
| JP | 2-94123 | | 4/1990 |
| JP | 4-20618 | | 2/1992 |
| JP | 5-62214 | * | 5/1993 |
| JP | 5-205299 | | 8/1993 |
| JP | 5-225587 | | 9/1993 |
| JP | 7-201055 | * | 7/1995 |
| JP | 2000329776 | * | 5/1999 |
| JP | 11-191228 | | 7/1999 |
| JP | 2002-25086 | | 1/2002 |

OTHER PUBLICATIONS

Correspondence from Foreign Patent Office, 2002-75051 (Office Action).

* cited by examiner

*Primary Examiner*—Lincoln Donovan
(74) *Attorney, Agent, or Firm*—Stein, McEwen & Bui, LLP (57) ABSTRACT

Magnets, which have a surface facing a coil, through which current flows, generate magnetic flux to be emitted toward the coil in the direction of the normal line of the surface of the magnets toward the coil, the magnets having a recession or protrusion formed at the center thereof. The magnets form magnetic flux to be regularly generated and thus can generate uniform electromagnetic forces through interaction with current.

20 Claims, 8 Drawing Sheets

MAGNET USED WITH AN OPTICAL PICKUP ACTUATOR

CROSS-REFERENCE TO RELATED APPLICATIONS

This application claims the benefit of Korean Patent Application No. 2001-60135 filed on Sep. 27, 2001, in the Korean Industrial Property Office, the disclosure of which is incorporated herein by reference.

BACKGROUND OF THE INVENTION

1. Field of the Invention

The present invention relates to a magnet, and more particularly, to a magnet which can generate magnetic flux to be more uniformly distributed around itself.

2. Description of the Related Art

Magnets are used in apparatuses using electromagnetic forces, such as optical pickup actuators, which are generally used in optical recording apparatuses to record and reproduce optical disks. In recent years, the size and compact disk access time of optical recorders have been reduced. Thus, optical pickup actuators are required to have a smaller size and provide higher disk-following speed. In addition, the optical pickup actuators are required to reproduce data from digital versatile disks (DVDs) as well as original compact disks (CDs).

To meet these requirements, the operational range of the optical pickup actuators must be expanded or maintained at a current level. In the meantime, non-uniformly distributed magnetic flux of a magnet, which is installed in an optical pickup actuator, may cause irregular thrust forces, i.e., irregular electromagnetic forces generated through interaction between the magnet and current, and irregular thrust forces may cause minor resonance of the optical pickup actuator. As the compact disk access time of the optical pickup actuator becomes reduced, the minor resonance phenomenon of the optical pickup actuator occurs more severely.

Here, the magnetic flux indicates that the number of magnetic lines that pass through the surface of a magnet, which is bounded by a closed loop, and the Si unit for the magnetic flux is tesla·meter$^2$, or webers (Wb).

Figure 1:
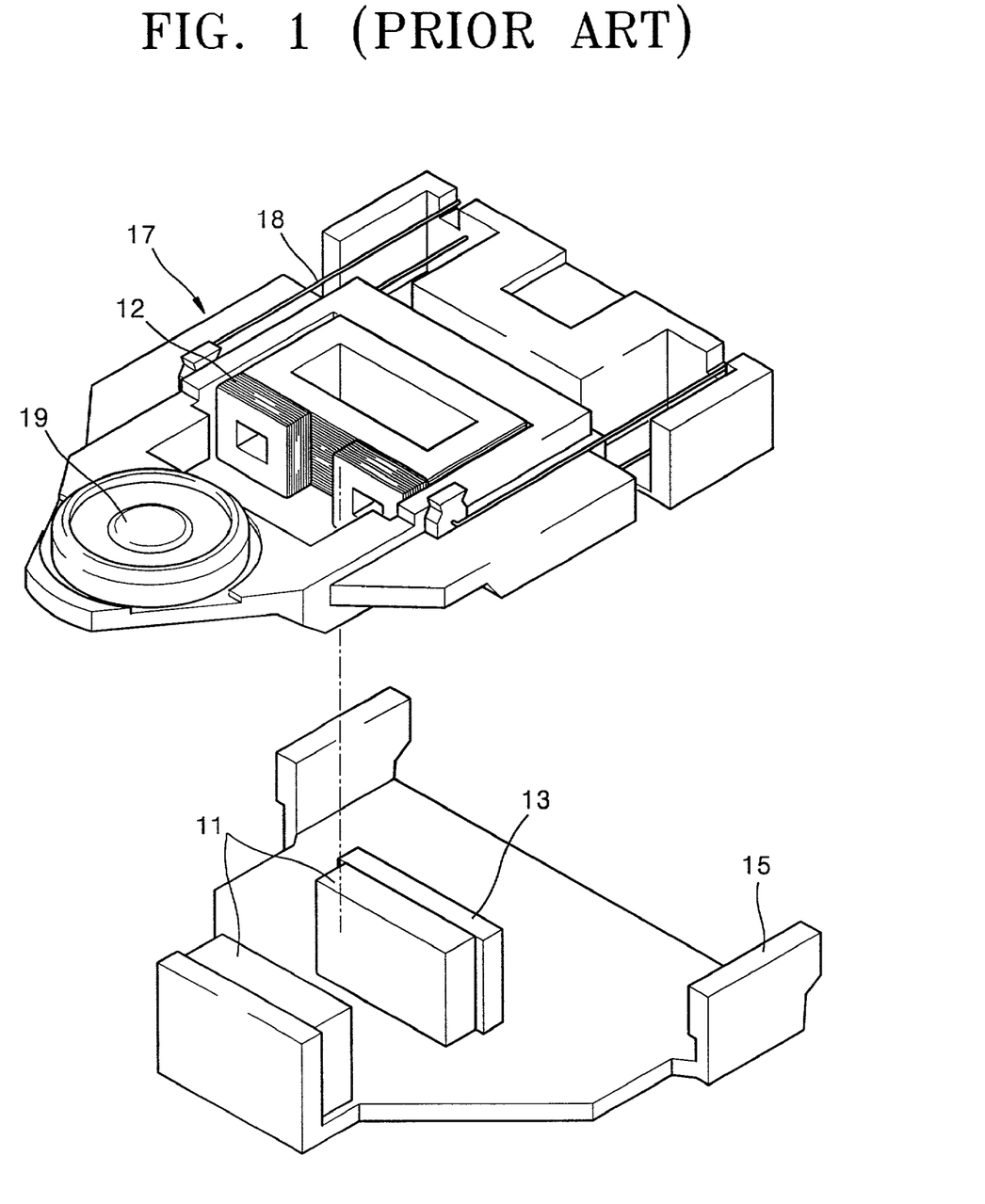
FIG. 1 is an exploded perspective view of a conventional asymmetric optical pickup actuator.
Figure 2:
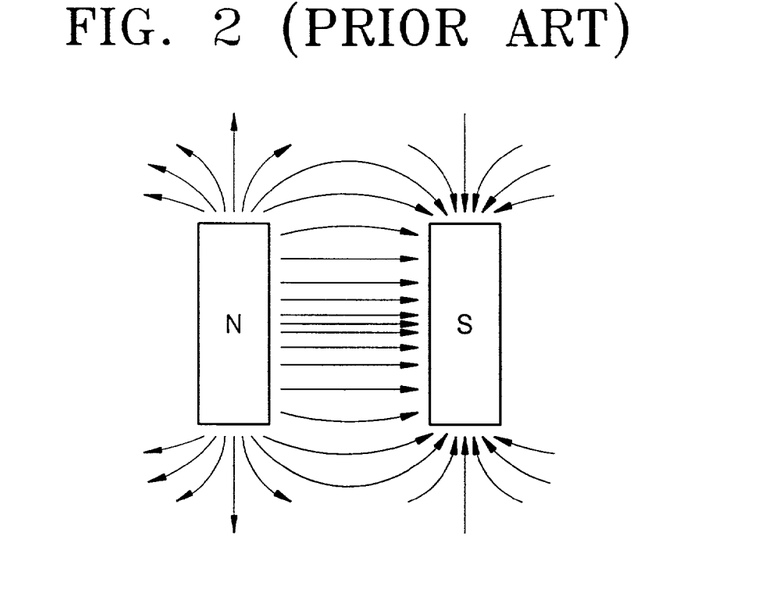
FIG. 2 is a view illustrating the distribution of the magnetic flux of a conventional magnet.

FIG. 1 is an exploded perspective view of a conventional asymmetric optical pickup actuator to which plate-shaped magnets are fixed, and FIG. 2 is a diagram illustrating the distribution of the magnetic flux of a general magnet. Referring to FIG. 1, an optical pickup actuator includes magnets 11; a yoke 13, to which the magnets 11 are fixed; a base 15, on which the yoke 13 is installed; a coil 12, which generates electromagnetic forces through interaction with the magnets 11; a bobbin 17, which allows the coil 12 to interact with the magnets 11 by coupling the base 15; an objective lens 19, which is installed on the bobbin 17; and a suspension 18, which supports the bobbin 17.

Referring to FIG. 2, the magnetic flux of each of the plate-shaped magnets 11 is concentrated at the center of the magnet 11. The closer to both ends of the magnet 11, the lower the density of the magnetic flux of the magnet 11, and thus the distribution of the magnetic flux of the magnet 11 at both ends of the magnet 11 becomes non-uniform.

Figure 3:
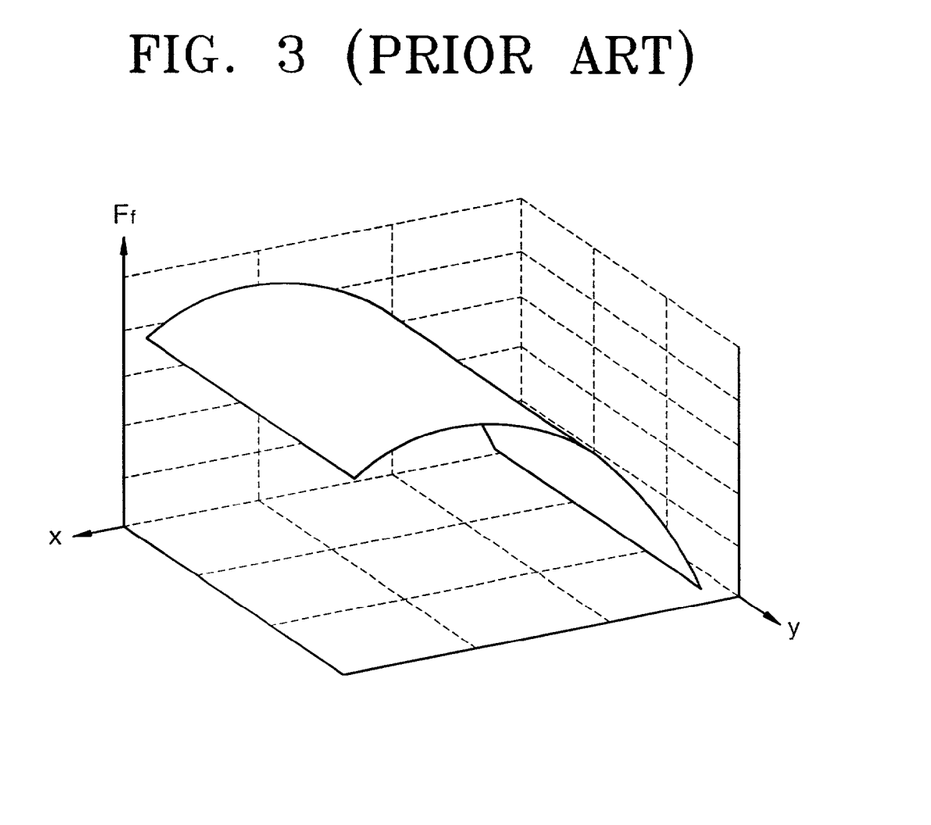
FIG. 3 is a graph illustrating thrust forces in a focusing direction during operation of a conventional asymmetric optical pickup actuator.
Figure 4:
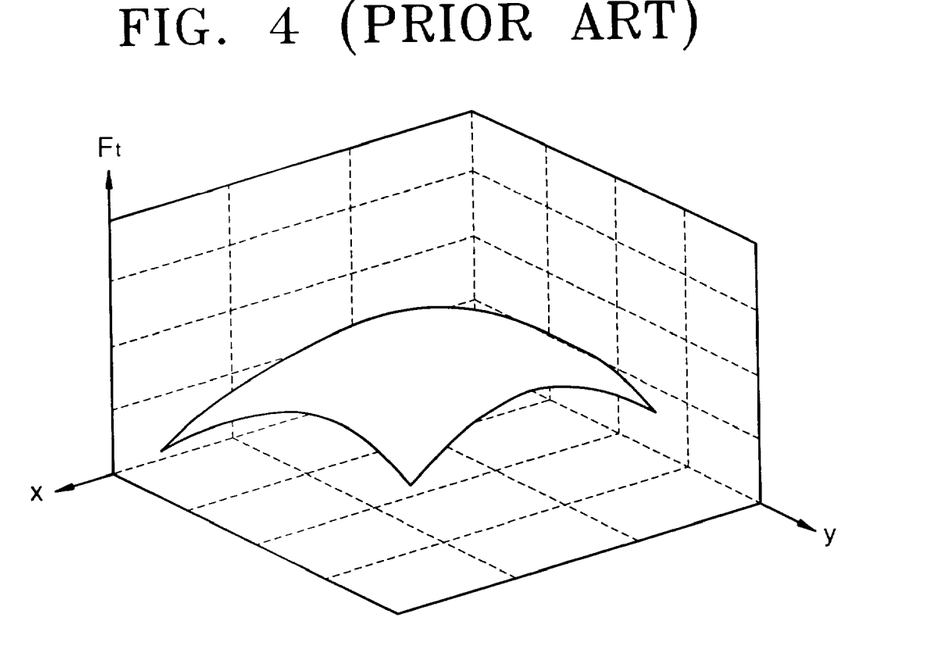
FIG. 4 is a graph illustrating thrust forces in a tracking direction during operation of a conventional asymmetric optical pickup actuator.

As illustrated in FIG. 2, in the case of installing magnets showing non-uniform distribution of magnetic flux in the optical pickup actuator shown in FIG. 1, thrust forces are generated in a focusing direction as illustrated in FIG. 3, and a tracking direction as illustrated in FIG. 4. In FIGS. 3 and 4, the X-axis represents the direction of the width of the surfaces of the magnets 11 facing the coil 12 and the Y-axis represents the direction of the height of the surfaces of the magnet 11 facing the coil 12.

The focusing and tracking operations of the optical pickup actuator are performed by electromagnetic forces generated through interaction between the magnets 11 and the coil 12 installed in the bobbin 17. The electromagnetic forces can be expressed by Equation (1).

$$\vec{F} = \vec{I}L \times \vec{B} \tag{1}$$

Here, F represents electromagnetic forces, I represents current, L represents the length of the coil 12, at which current flows, and B represents the magnetic field. Here, the magnetic field, that is the magnetic flux density (B), indicates magnetic flux per unit area and is measured in Teslas. Here, $1T = 1$ Wb/m$^2$.

Referring to FIG. 3, during operation of the optical pickup actuator, thrust forces in a focusing direction are stronger at the center of the magnet 11 than the other portions of the magnet 11. Here, the thrust forces represent electromagnetic forces generated between the coil 12 and the magnets 11 to follow a disk in the optical pickup actuator.

An assembly of the coil 12 and the bobbin 17 perform an on-focusing operation to read data from an optical disk and operate in a predetermined operational range in order to follow the optical disk that wobbles. During the disk-following operation, an assembly of the coil 12 and the bobbin 17 moves about the center of the magnet 11 in a vertical direction. When the assembly of the coil 12 and the bobbin 17 moves close to the center of the magnet 11, the maximum thrust forces are generated. On the other hand, when the assembly of the coil 12 and the bobbin 17 moves toward either end of the magnet 11, the minimum thrust forces are generated.

Referring to FIG. 4, when the assembly of the coil 12 and the bobbin 17 performs an on-tracking operation, the assembly of the coil 12 and the bobbin 17 operates in a predetermined operational area moving about the center of the magnet 11 in a horizontal direction in order to follow an optical disk that wobbles. During the on-tracking operation of the assembly of the coil 12 and the bobbin 17, the thrust forces in a tracking direction are stronger at the center of each magnet 11 than at the other portions of each magnet 11.

Thrust forces irregularly distributed in focusing and tracking directions cause the minor resonance phenomenon of the optical pickup actuator to occur. Here, the minor resonance phenomenon indicates a resonance phenomenon caused by the inherent frequencies of an optical disk and an actuator, and the minor resonance phenomenon of an optical disk means that the optical disk operates unstably.

In other words, the conventional magnet generates irregular thrust forces due to non-uniformly distributed magnetic flux, and the irregular thrust forces cause an optical pickup actuator to operate unstably.

SUMMARY OF THE INVENTION

Accordingly, it is an object of the present invention to provide a magnet which can generate magnetic flux to be uniformly distributed around itself, can solve the problem of unstable operations of an optical pickup actuator, such as minor resonance, caused by thrust forces irregularly generated due to the nonlinear characteristics of electromagnetic forces, and thus can allow the optical pickup actuator to stably operate.

Additional objects and advantages of the invention will be set forth in part in the description which follows and, in part, will be obvious from the description, or may be learned by practice of the invention.

The foregoing and other objects of the present invention are achieved by providing a magnet, which has a surface facing a coil at which current flows, and generates magnetic flux to be emitted toward the coil in the direction of the normal line of the surface of the magnet toward the coil, the magnet comprising a recession formed at the center of the surface of the magnet.

According to the present invention, it is possible to allow an optical pickup actuator to stably operate, preventing a minor resonance phenomenon of the optical pickup actuator from occurring, by modifying the shape or magnetization direction (the direction of magnetic flux) of a magnet to make its magnetic flux to become uniform.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIGS. 5 through 10 are views illustrating magnets according several different embodiments of the present invention. Referring to Equation (1), the magnets according to these embodiments of the present invention can generate magnetic flux through interaction with current to be regularly distributed around themselves.

Figure 5:
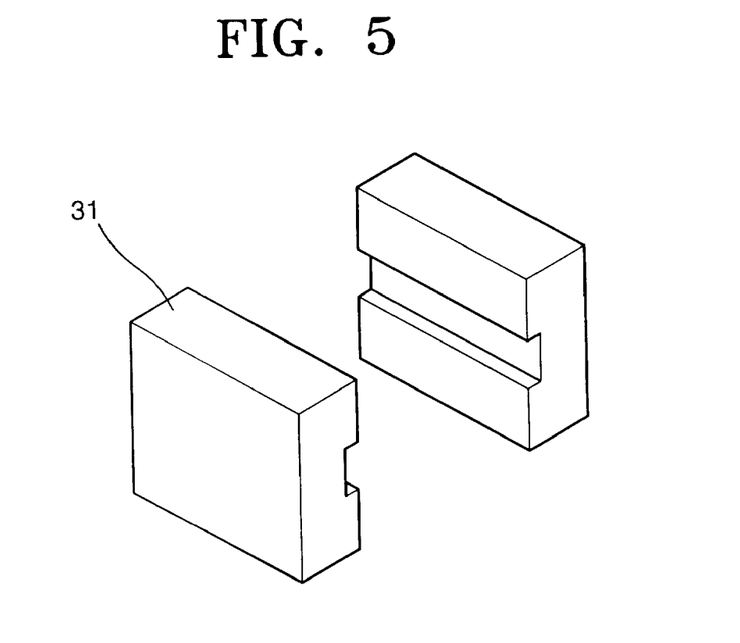
FIG. 5 is a perspective view of a magnet according to an embodiment of the present invention.
Figure 6:
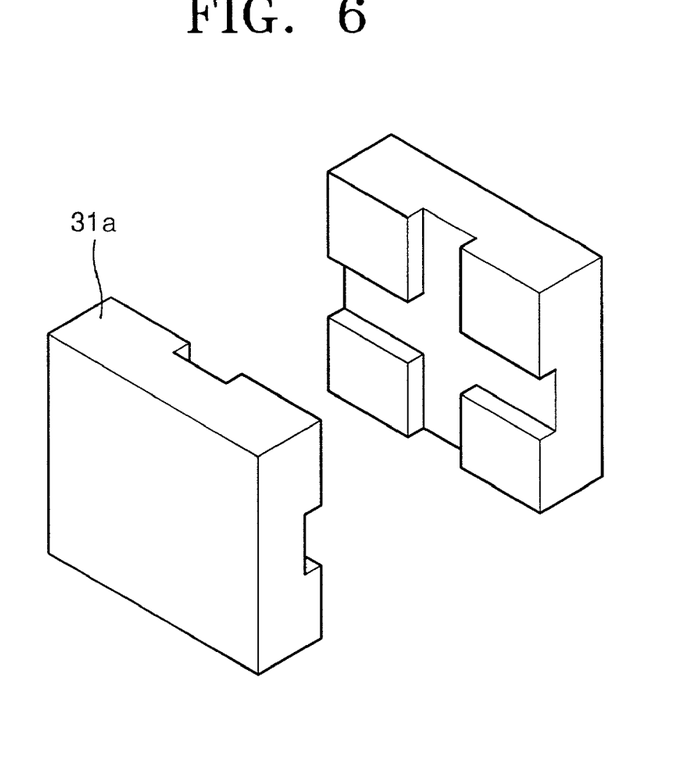
FIG. 6 is a perspective view of a magnet according to another embodiment of the present invention.
Figure 7:
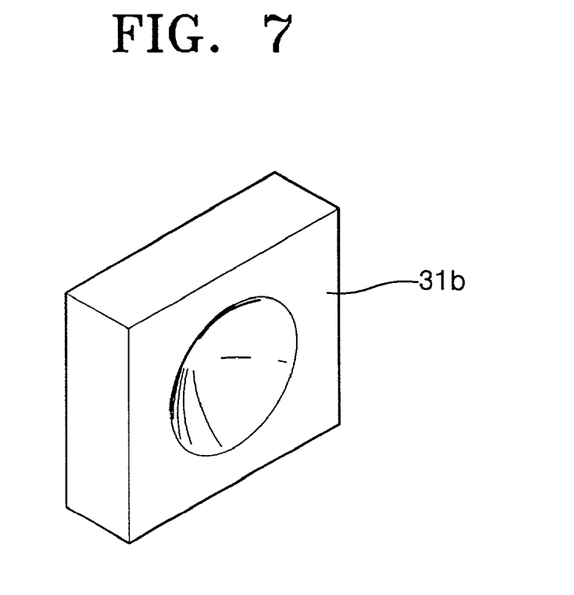
FIG. 7 is a perspective view of a magnet according to yet another embodiment of the present invention.

Referring to the magnets according to the embodiments of the present invention illustrated in FIGS. 5–7, the magnetic flux at the surface of each of the magnets is emitted in the normal line direction with respect to the surface of each of the magnets, and a recession is formed at the center of the surface of each of the magnets.

Referring to FIG. 5, a recession is formed to extend in one direction along the surface of a magnet 31 according to this embodiment of the present invention, and thus the cross-section of the magnet 31 is U-shaped. Accordingly, the density of the magnetic flux of the magnet 31 is lowest in the recession but is highest at either end of the magnet 110, and thus the degree to which the magnetic flux of the magnet 31 is non-uniformly distributed can be alleviated or reduced non-uniformly.

As illustrated in FIG. 5, the magnet 31 according to the FIG. 5 embodiment of the present invention has a recession formed on the surface of the magnet 31 facing a coil, through which current flows, to extend in a horizontal direction along the surface of the magnet 31. However, a magnet, which is formed to have a recession formed at the center of the surface thereof facing a coil to extend in a vertical direction along the surface, thereof thus having a U-shaped top surface, may be provided as an alternative example of the FIG. 5 embodiment of the present invention.

The magnetic flux of the magnet according to this alternative embodiment of FIG. 5, which has a recession vertically extending along the surface of the magnet, is distributed in almost the same shape as the magnetic flux of the magnet 31 illustrated in FIG. 5. In other words, the density of the magnetic flux of the magnet according to this alternative embodiment is lowest in the recession but is highest at either end of the magnet. Thus, the degree to which the magnetic flux of the magnet according to this alternative embodiment is non-uniformly distributed can also be alleviated, or reduced to a lesser degree.

The magnet 31 according to the first embodiment provided in FIG. 5 is formed to be capable of generating magnetic flux uniformly distributed so that thrust forces can be regularly generated in a focusing direction. The magnet according to the alternative embodiment to FIG. 5 is formed to be capable of generating magnetic flux to be regularly distributed so that thrust forces can be regularly generated in a tracking direction.

Since an optical pickup actuator has a wide range of focusing operation, it is possible to alleviate irregularity of thrust forces by correcting the distribution of the magnetic flux of a magnet in the focusing direction, like in the embodiment of the present invention illustrated in FIG. 5. However, it is possible to modify the shape of a magnet to have regularly distributed magnetic flux in both the focusing direction and a tracking direction.

Referring to FIG. 6, a cross-shaped groove is formed passing through the center of the surface of a magnet 31a according to another embodiment of the present invention and extends in first and second directions, which form a right angle with each other, i.e., in a focusing direction and a tracking direction, along the surface of the magnet 31a. The magnet 31a according to this embodiment can also have uniformly distributed magnetic flux in both the focusing and tracking directions.

The grooves of the magnets 31 and 31a, as illustrated in FIGS. 5 and 6, may be formed in a half cylindrical shape so that the magnetic flux of the magnets 31 and 31a can be more uniformly distributed.

Referring to FIG. 7, a magnet 31b according another embodiment of the present invention has a hemispherical-shaped recession formed at its center so that the magnetic flux of the magnet 31b can be uniformly distributed in a focusing direction and a tracking direction.

Figure 8:
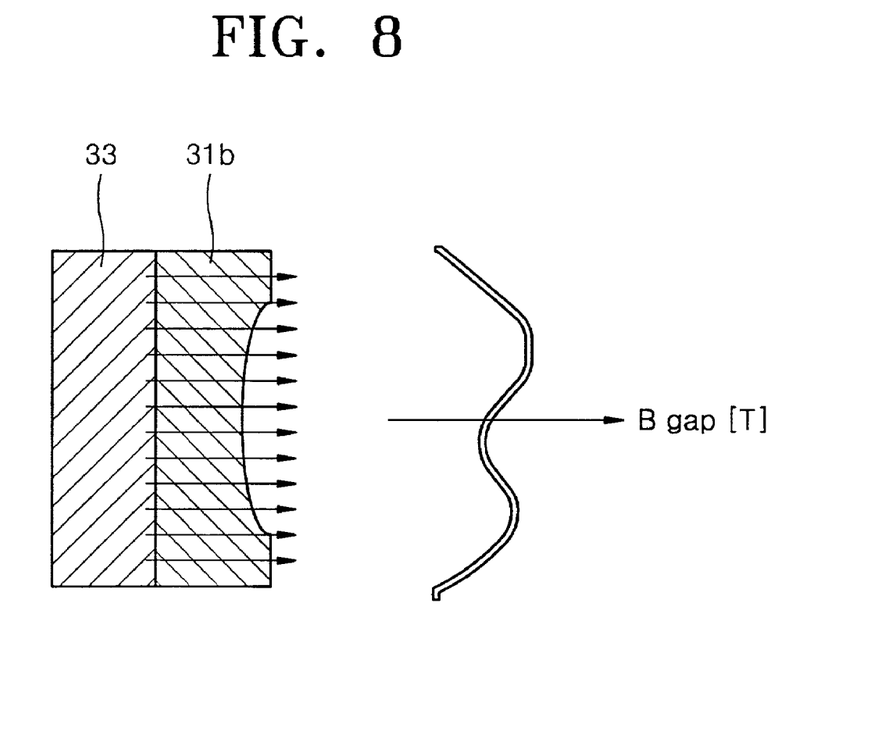
FIG. 8 is a cross-sectional view of the magnet illustrated in FIG. 7.

FIG. 8 is a cross-sectional view of the magnet 31b illustrated in FIG. 7. Referring to FIG. 8, the intensity of the magnetic flux of the magnet 31b varies in accordance with the size of a gap between the center of the magnet 31b and both ends of the magnet 31b. The magnetic flux of the magnet 31b is weakest at the center of the magnet 31b. The closer to both ends of the magnet 31b, the stronger the magnetic flux of the magnet 31b. A magnet having a half cylindrical shaped recession formed in either a focusing direction or a tracking direction may have the same cross section as the magnet 31b shown in FIG. 7. The magnet having a cylinder-shaped groove formed in a predetermined direction can allow the distribution of the magnetic flux of the magnet in the predetermined direction to be corrected. Here, 33 is the yoke, to which the magnet 31b is fixed.

FIGS. 6 through 10 are views illustrating magnets 31a, 31b, and 31c according to three different embodiments of the present invention, which are formed to allow their magnetic fluxes to be uniformly distributed in both focusing and tracking directions. The magnets 31, 31a, and 31b according to the embodiments illustrated in FIGS. 5–7 are formed to have a recession so that the intensity of the magnetic flux of the magnets 31, 31a, and 31b can be reduced in the recession. Accordingly, the intensity of the magnetic flux of the magnets 31, 31a, and 31b is weaker in the recession than at either end of each of the magnets 31, 31a, and 31b, and thus the magnetic flux of the magnets 31, 31a, and 31b can be uniformly distributed.

Figure 9:
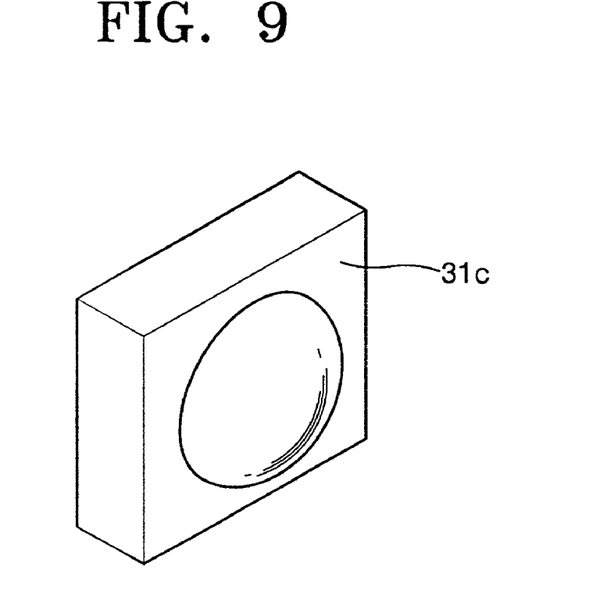
FIG. 9 is a perspective view of a magnet according to yet another embodiment of the present invention.
Figure 10:
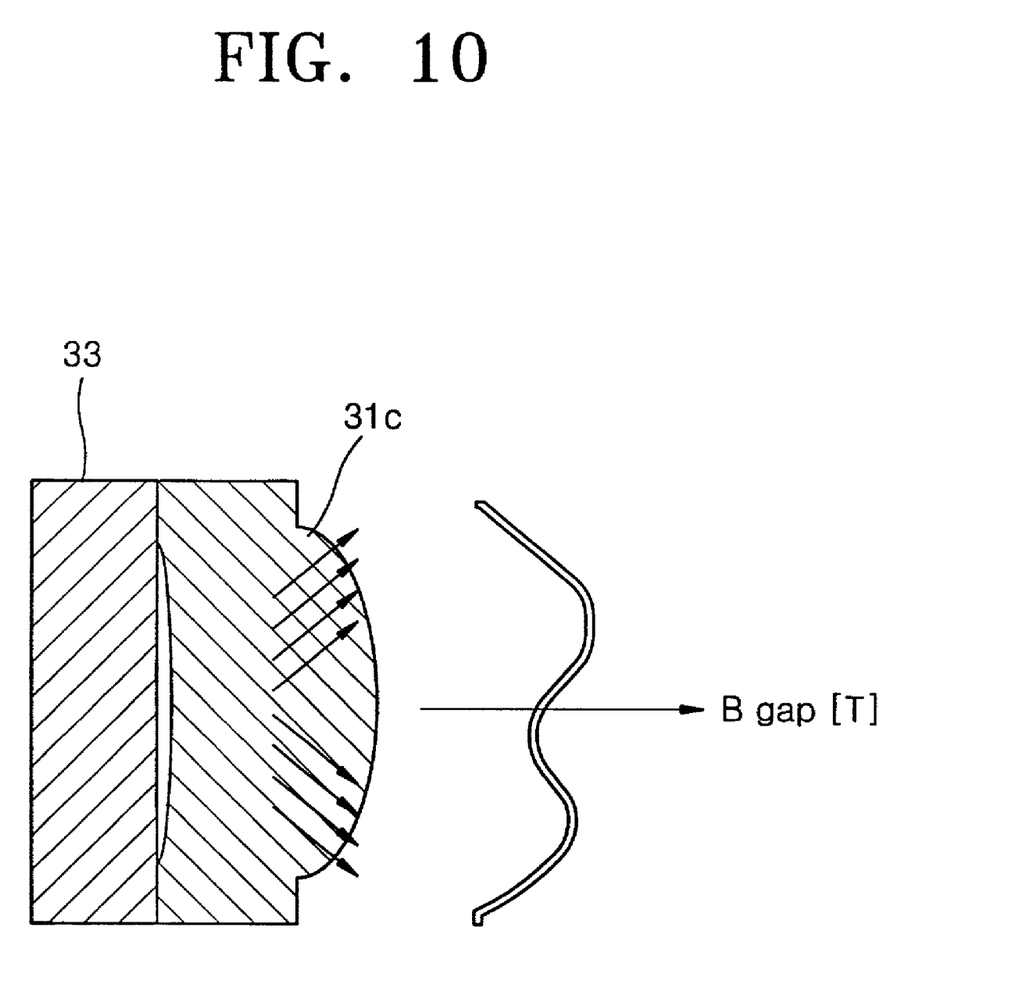
FIG. 10 is a cross-sectional view of the magnet illustrated in FIG. 9.

Referring to FIGS. 9 and 10, a magnet 31c according to this embodiment is formed to have a protrusion at the center of the surface of the magnet 31c facing a coil, through which current flows, so that the magnetic flux of the magnet 31c can be generated in a slanting line direction with respect to the normal line of the surface of the magnet 31c.

Specifically, referring to FIG. 9, the magnet 31c according to this embodiment has a hemispherical protrusion so that the magnetic flux of the magnet 31c can be regularly distributed in a focusing direction and a tracking direction, and magnetization of the magnet 31c can be formed in a radius direction. Here, the radius direction indicates a slanting direction with respect to the normal line of the surface of the magnet 31c. In the embodiment illustrated in FIG. 9, the intensity of the magnetic flux of the magnet 31c is made to be weakest at the center of the magnet 31c by changing the direction of magnetization of the magnet 31c, and the closer to the center of the magnet 31c, the stronger the intensity of the magnetic flux of the magnet 31c.

Referring to FIG. 10, lines of magnetization of the magnet 31c form a predetermined angle with the surface of the yoke 33 and point in the radial direction with respect to the central axis of the hemispherical protrusion. Thus, the intensity of the magnetic flux of the magnet 31c is weakest at the center of the hemispherical protrusion of the magnet 31c but becomes stronger in the direction of magnetization of the magnet 31c.

A magnet having a cylinder-shaped protrusion formed in a focusing direction or a tracking direction in an optical pickup actuator and having lines of magnetization formed in a radius direction may have the same cross section as the magnet 31c according to the embodiment illustrated in FIGS. 9 and 10. In order to compensate for thrust forces in a focusing direction, a magnet having a half cylindrical shaped protrusion, which has a central axis existing in a horizontal direction, may be used. On the other hand, in order to compensate for thrust forces in a tracking direction, a magnet having a half cylindrical shaped protrusion, which has a central axis existing in a vertical direction, may be used.

Alternatively, a magnet having a protrusion formed at its center to extend in one direction or to extend in two directions, which orthogonally cross each other, along the surface of the magnet may be formed so that lines of magnetization of the magnet can be formed in a slanting direction with respect to the normal line of the surface of the magnet.

Figure 11:
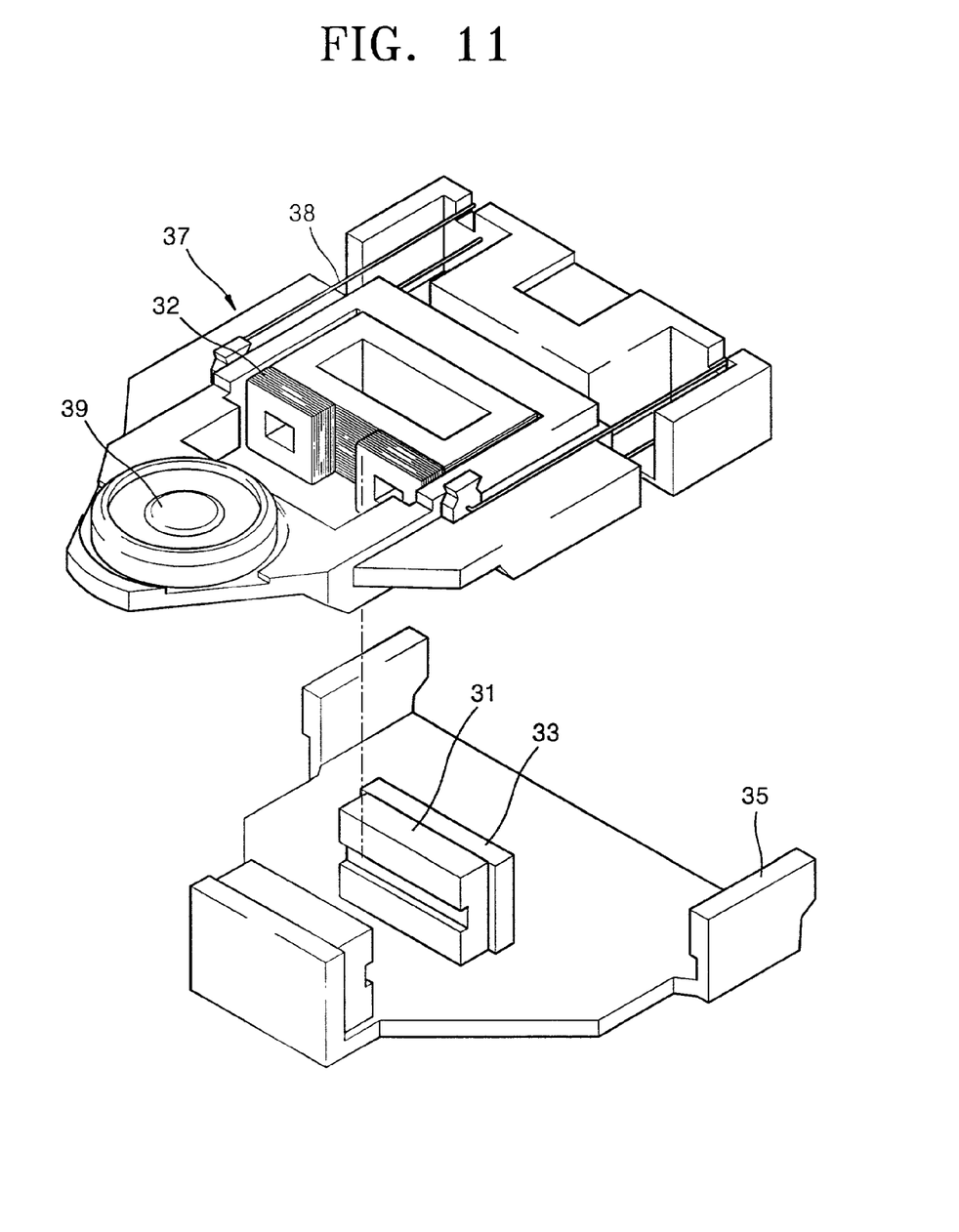
FIG. 11 is an exploded perspective view of an optical pickup actuator illustrated in FIG. 5.

FIG. 11 is an exploded perspective view of an optical pickup actuator used with the magnet illustrated in FIG. 5. Referring to FIG. 11, an optical pickup actuator includes magnets 31, a yoke 33, to which the magnets 31 are fixed, a base 35, in which the yoke 33 is installed, a coil 32, which generates electromagnetic forces through interaction with the magnet 31, a bobbin 37, in which the coil 32 is formed, and a suspension 38, which supports the bobbin 37 and connects the bobbin 37 to the base 35. The optical pickup actuator according to this embodiment is an asymmetric optical pickup actuator.

The magnets 31 are the same as the magnet according to that illustrated in FIG. 5 and elevates the functions of the optical pickup actuator by preventing unstable operation of the optical pickup actuator, such as minor resonance. The optical pickup actuator according to this embodiment may be formed to include any of the magnets according to FIGS. 6–9 or a magnet according to another embodiment of the present invention.

The magnets 31 are fixed to the yoke 33, and the yoke 33 is installed in the base 35. The coil 32, through which current flows, generates electromagnetic forces through interaction with the magnet 31 and is installed in the bobbin 37. An objective lens 39 is installed in the bobbin 37 and is used to follow an optical disk in the focusing or tracking operations and applies beams from a light source.

Electromagnetic forces generated through interaction between the magnets 31 and the coil 32 can satisfy equations of force, such as Equation (1), and act according to Fleming's left-hand law.

Figure 12:
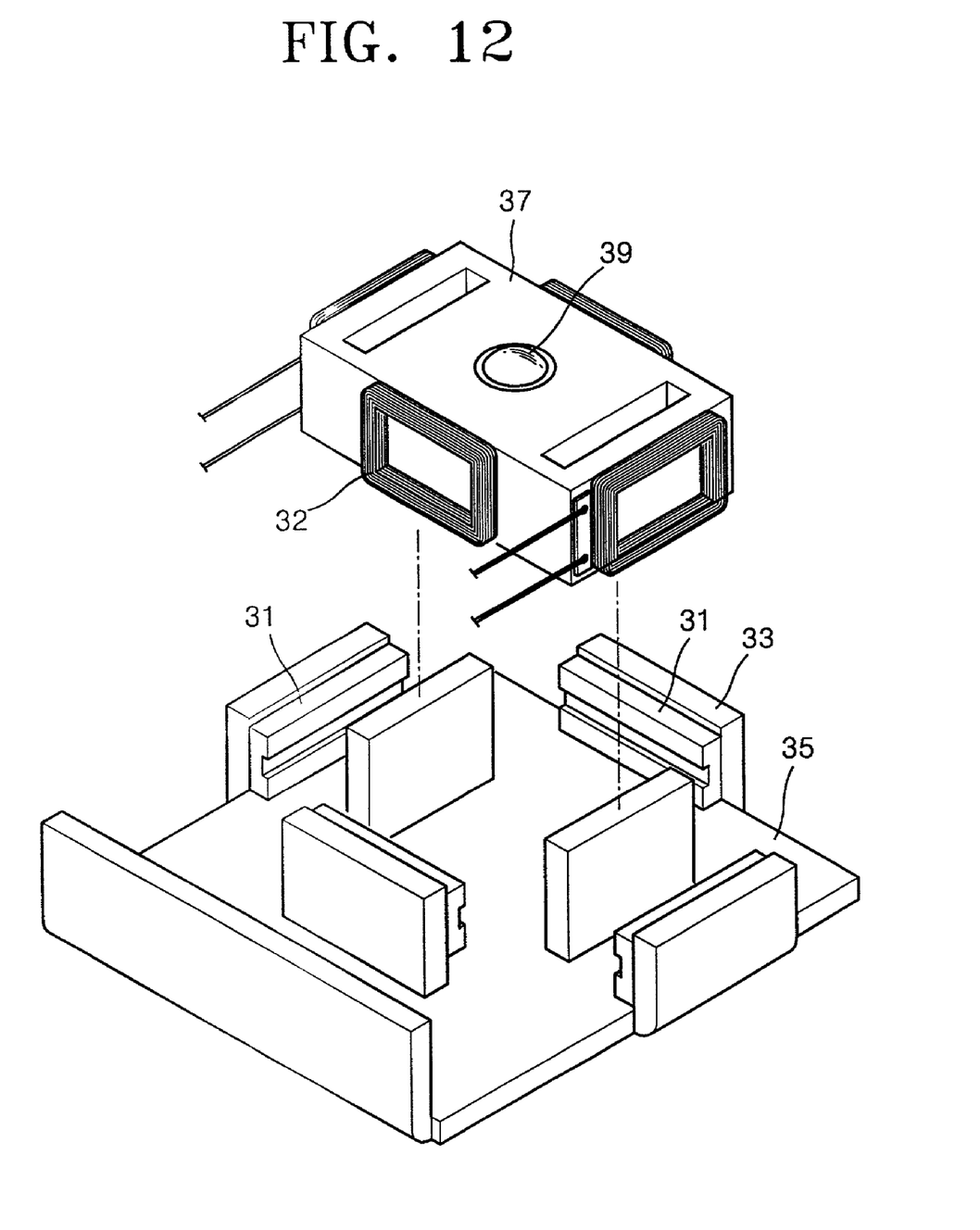
FIG. 12 is an exploded perspective view of an optical pickup actuator according to another embodiment of the present invention.

FIG. 12 is an exploded perspective view of an optical pickup actuator according to another embodiment of the present invention. The optical pickup actuator according to this embodiment includes four of the magnets 31 according to the embodiment illustrated in FIG. 5. In this embodiment, a magnet 31 is place on each of four sides of the base 35 and facing a respective coil 12 on the bobbin 37. Thus, the magnetic flux of the magnet 31 can be more regularly distributed, and the optical pickup actuator can stably operate.

According to the present invention, the intensity of the magnetic flux of a magnet can be more regularly distributed by modifying the shape or magnetization direction of the magnet. In addition, if an optical pickup actuator is formed to include the magnet, the optical pickup actuator can stably operate, and the performance of the optical pickup actuator can be improved.

As described above, since the magnet according to the present invention can form magnetic flux to be regularly distributed, it is possible to uniformly generate electromagnetic forces through interaction with current.

In addition, the performance of the optical pickup actuator according to the present invention can be improved by removing causes of unstable operations of the optical pickup actuator, such as minor resonance.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical actuator including at least one magnet; a yoke which fixes the at least one magnet; a base on which the yoke is installed; a bobbin, which moves freely relative to the base; a coil which generates magnetic flux in the at least one magnet as a result of the movement of the bobbin; an objective lens, installed on the bobbin; and a suspension supporting the bobbin, wherein the at least one magnet, which has a surface facing the coil, through which current flows, and generates the magnetic flux to be uniformly distributed around the at least one magnet and emitted toward the coil in a direction of a normal line of the surface of the at least one magnet facing the coil, the at least one magnet comprising a recession formed along a center of the surface of the at least one magnet facing the coil in a direction which is perpendicular to a longitudinal axis of the base.

2. The optical actuator according to claim 1, wherein the recession formed on the at least one magnet is formed to extend in one direction along the surface of the at least one magnet.

3. The optical actuator according to claim 1, wherein the recession formed on the at least one magnet is formed to extend in first and second directions along the surface of the magnet, said first and second directions being at right angles with respect to each other.

4. The optical actuator according to claim 1, wherein the recession formed on the at least one magnet is a rectangular shape.

5. The magnet according to claim 1, wherein the recession is formed in a half cylindrical shape.

6. The magnet according to claim 1, wherein the recession is formed in a hemispherical shape.

7. An optical actuator including at least one magnet; a yoke which fixes the at least one magnet; a base on which the yoke is installed; a bobbin, which moves freely relative to the base; a coil which generates magnetic flux in the at least one magnet as a result of the movement of the bobbin; an objective lens, installed on the bobbin; and a suspension supporting the bobbin, wherein the at least one comprising:
a surface, having a departure from a flat surface substantially at a center of the flat surface, through which a current flows generating the magnetic flux to be uniformly distributed around the at least one magnet and emitted toward the coil,
wherein the flat surface faces the coil and the departure from the flat surface is a recession formed along a center of the surface of the at least one magnet facing the coil in a direction which is perpendicular to a longitudinal axis of the base.

8. The optical actuator according to claim 7, wherein the recession from the flat surface formed on the at least one magnet extends along the surface of the at least one magnet.

9. The optical actuator according to claim 8, wherein the recession formed on the at least one magnet extends in a first and a second direction along the surface of the at least one magnet, the first direction substantially at a right angle to the second direction.

10. The optical actuator according to claim 7, wherein the recession formed on the at least one magnet is one of a rectangular shape, a half-cylindrical shape, or a hemispherical shape.

11. The magnet according to claim 7, wherein the departure from the flat surface is a protrusion and the magnetic flux is emitted substantially at a slanted angle with respect to the normal line of the surface.

12. The magnet according to claim 11, wherein the protrusion extends along the surface of the magnet.

13. The magnet according to claim 11, wherein the protrusion extends in a first and a second direction along the surface of the magnet, the first direction substantially at a right angle to the second direction.

14. The magnet according to claim 11, wherein the protrusion is one of a half-cylindrical shaped or a hemispherical-shaped dome.

15. The magnet according to claim 7, wherein the departure from the flat surface is hemispherical-shaped.

16. An optical actuator including at least one magnet; a yoke which fixes the at least one magnet; a base on which the yoke is installed; a bobbin, which moves freely relative to the base; a coil which generates magnetic flux in the at least one magnet as a result of the movement of the bobbin; an objective lens, installed on the bobbin; and a suspension supporting the bobbin, wherein the at least one magnet, which has a surface facing the coil, through which current flows, and generates the magnetic flux to be uniformly distributed around the at least one magnet and emitted toward the coil in a direction of a normal line of the surface of the at least one magnet facing the coil, the at least one magnet comprising a single recession formed along a center of the surface of the at least one magnet facing the coil.

17. The optical actuator according to claim 16, wherein the single recession formed on the at least one magnet is formed to extend in first and second directions along the surface of the at least one magnet, said first and second directions being at right angles with respect to each other.

18. The optical actuator according to claim 16, wherein the single recession formed on the at least one magnet is a rectangular shape.

19. A magnet, which has a surface facing a coil, through which current flows, and generates magnetic flux to be uniformly distributed around the magnet and emitted toward the coil in a direction of a normal line of the surface of the magnet facing the coil, the magnet comprising a single recession formed at a center of the surface of the magnet facing the coil.

20. The magnet according to claim 19, wherein the single recession formed on the one magnet is a rectangular shape.

* * * * *